May 3, 1932.  T. GABILL  1,856,994
INTERNAL COMBUSTION ENGINE
Filed Aug. 8, 1930   4 Sheets-Sheet 1
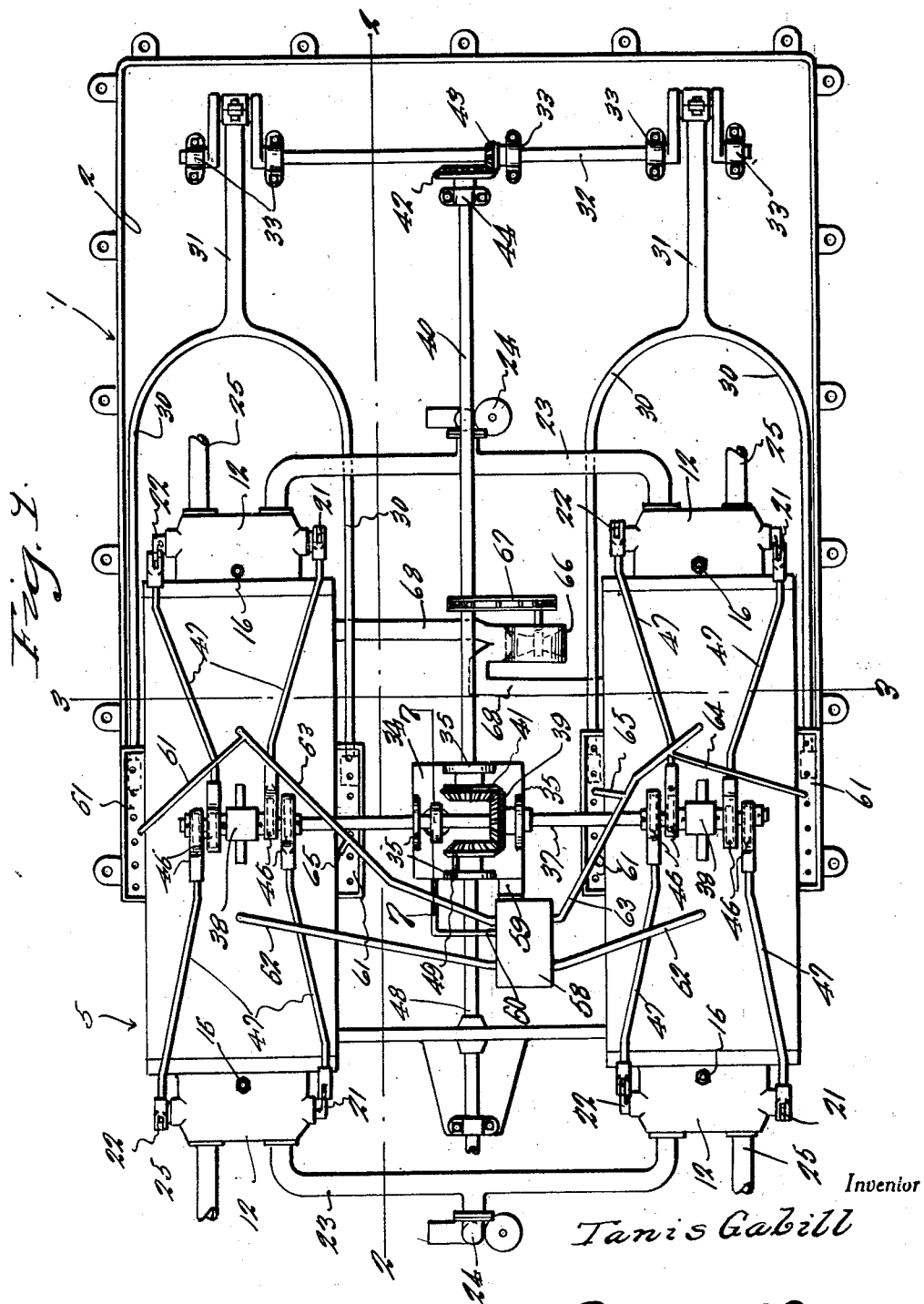
Inventor
*Tanis Gabill*
By *Clarence A. O'Brien*
Attorney

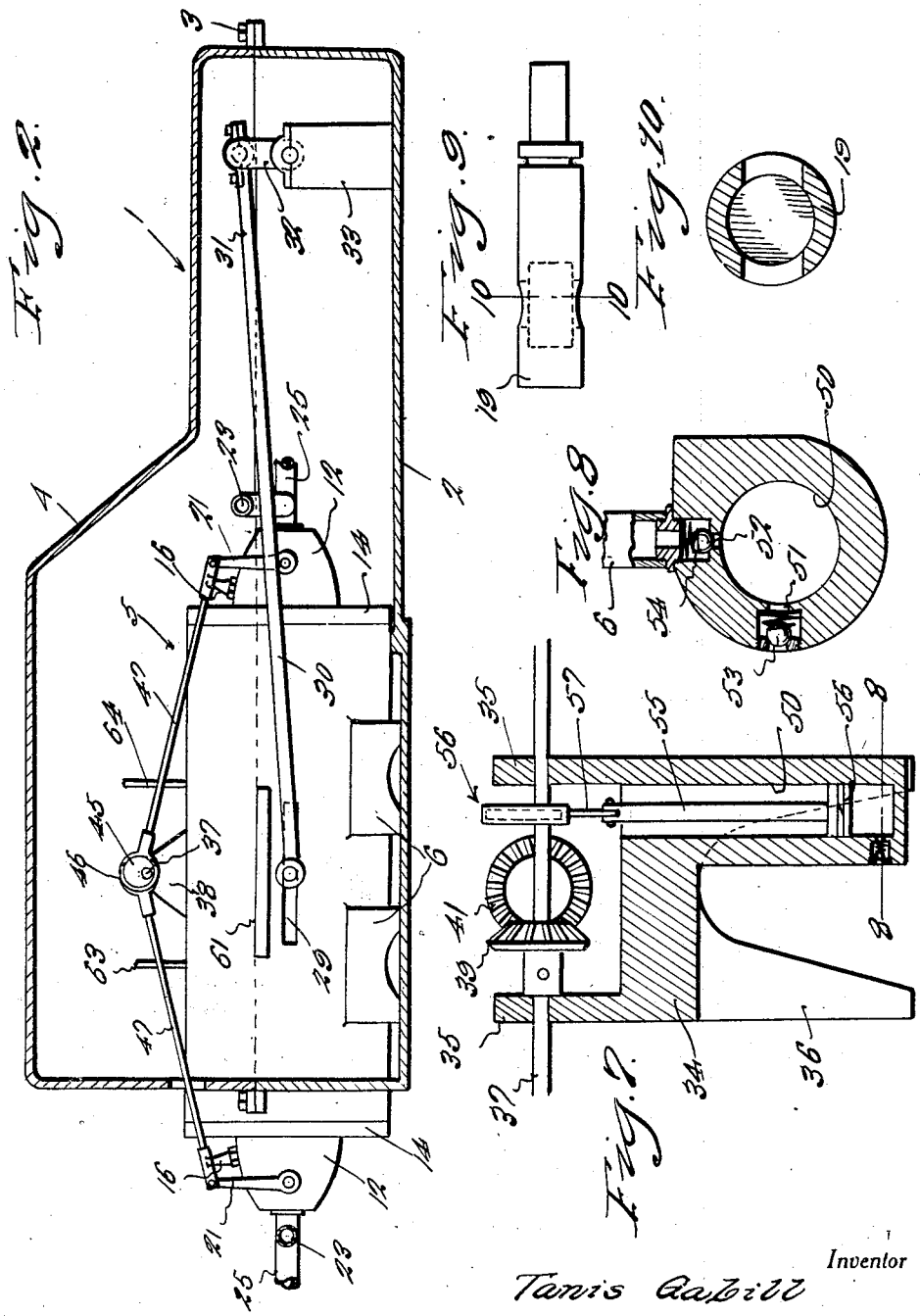

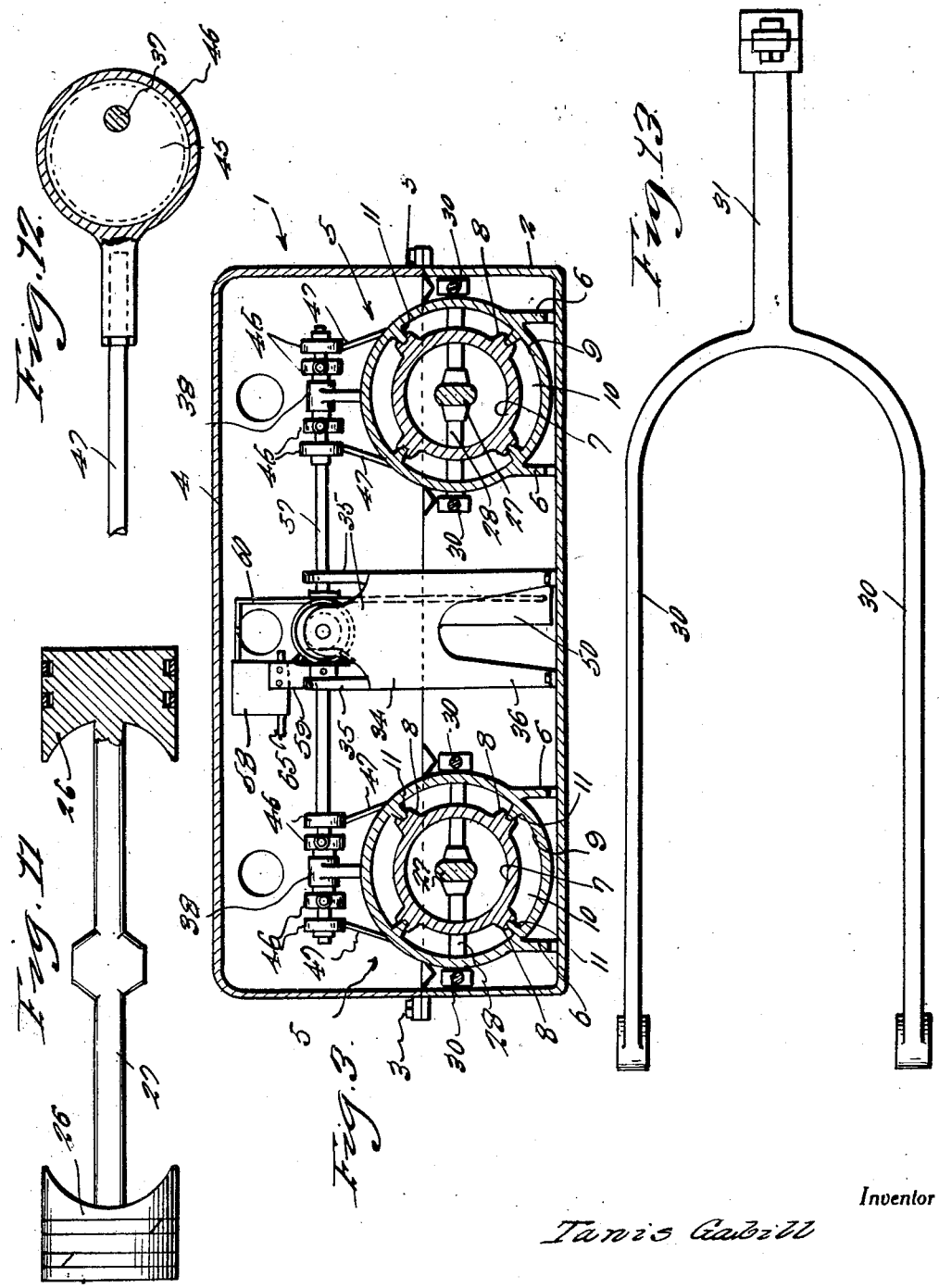

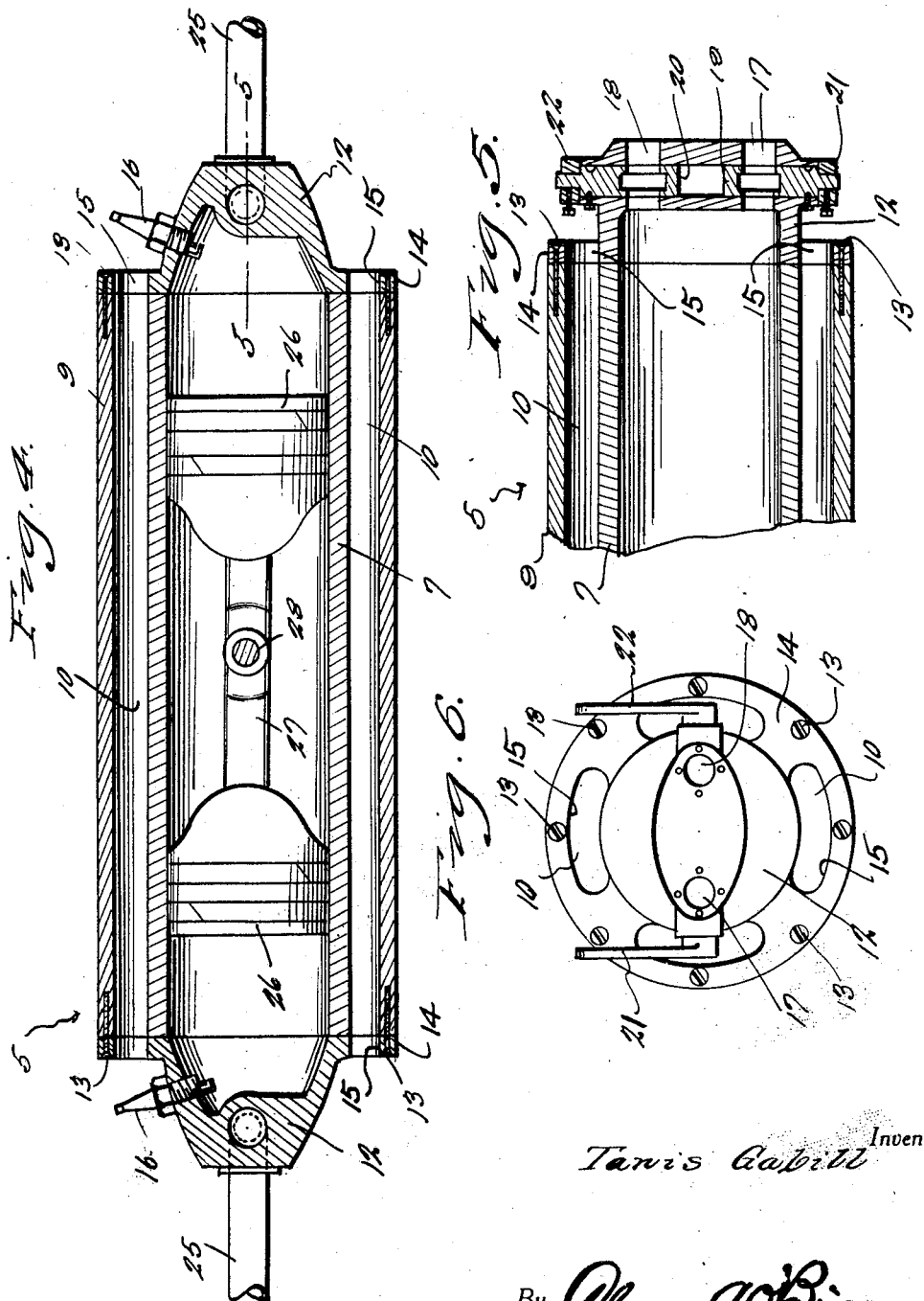

Patented May 3, 1932

1,856,994

UNITED STATES PATENT OFFICE

TANIS GABILL, OF BERLIN, NEW HAMPSHIRE

INTERNAL COMBUSTION ENGINE

Application filed August 8, 1930. Serial No. 473,927.

This invention relates to improvements in an internal combustion engine and has for its primary object to provide, in a manner as hereinafter set forth an engine embodying a novel construction and arrangement of parts, whereby quiet and economical operation is assured, said engine further being simple in construction, strong, durable, and comprising comparatively few parts, thus permitting the same to be manufactured at comparatively low cost.

All of the foregoing and still further objects and advantages of the invention may become apparent from a study of the following specification, taken in connection with the accompanying drawings, wherein like characters of reference designate corresponding parts throughout the several views, and wherein:

Figure 1 is a top plan view of an engine constructed in accordance with the present invention.

Figure 2 is a view in vertical longitudinal section, taken substantially on the line 2—2 of Figure 1, with the cover portion of the housing in position.

Figure 3 is a vertical transverse sectional view, on the line 3—3 of Figure 1.

Figure 4 is a vertical, longitudinal sectional view, through one of the cylinders.

Figure 5 is a sectional view, taken substantially on the line 5—5 of Figure 4, showing the construction of the intake and exhaust valves.

Figure 6 is a view in end elevation of one of the cylinders.

Figure 7 is a vertical sectional view through the oil pump, taken substantially on the line 7—7 of Figure 1.

Figure 8 is a horizontal sectional view, taken substantially on the line 8—8 of Figure 7.

Figure 9 is a detail view, in elevation of one of the intake or exhaust valves.

Figure 10 is a cross-sectional view, taken substantially on the line 10—10 of Figure 9.

Figure 11 is a detail view, principally in elevation and partly in section, showing a pair of the connected sections.

Figure 12 is a detail view, principally in section, showing the valve operating cam and the connection of one of the valve operating rods therewith.

Figure 13 is a detail view, in top plan, of one of the connecting rods.

Referring to the drawings in detail, it will be seen that the reference numeral 1 designates a housing which comprises the pan portion 2, upon which is bolted as at 3, the removable cover portion 4. A pair of spaced, parallel, horizontally disposed cylinders, designated generally by the reference numerals 5 are mounted in the housing 4, and extend through one of the end walls thereof, said cylinders being mounted on the bases 6, the cylinders 5 being identical in construction, and a detailed description of one will, therefore, suffice for both.

Each of the cylinders 5, comprises an inner wall 7, having formed integrally thereon and extending longitudinally, the circumferentially spaced radiating longitudinally grooved ribs 8. The inner wall 7 constitutes a sleeve, which is opened at its opposite ends. An outer wall 9, is disposed in spaced concentric relation to the inner wall 7, in a manner to provide the longitudinal air passages 10, said outer wall 9 having formed integrally on its inner periphery, the inwardly extending ribs 11, which engage in the grooves of the radiating ribs 8 of the inner walls 7. Heads 12 are removably secured on each end of each of the cylinders 5, by means of screws, bolts or the like 13, extending through the flanged portions 14 of the heads, and threaded into the opposite end portions of the outer walls 9. The flanges 14 of the heads are provided with openings 15, which communicate with the air passages 10. A spark plug 16 is threaded into each of the heads 12.

The heads 12 are each further formed to provide the inlet ports 17 and the exhaust or outlet ports 18, which are controlled by the oscillatory valves 19 and 20 respectively, having the operating arms 21 and 22 fixed on their outer ends. Intake manifolds 23 communicate with the intake ports 17 on the opposite ends of the cylinders 5, said intake manifolds each having connected thereto a suitable carburetor 24, to which fuel may be supplied from any suitable source. Exhaust pipes 25 communicate with the exhaust ports 18, to receive the spent gases from the opposite ends of the cylinders 5.

A pair of oppositely disposed pistons 26 are mounted for reciprocation in the opposite end portions of each of the cylinders 5, said pistons 26 being rigidly connected together by the bar 27.

Horizontally disposed transverse piston pins 28 extend through intermediate portions of the bars 27 and are operable through longitudinally extending registering slots 29, divided in the inner and outer walls 7 and 9 of the cylinders 5, said piston pins projecting beyond the opposite sides of the cylinders 5 and having pivotally connected thereto the bifurcations 30 of the connecting rods 31, which are operatively connected to the crank shaft 32, which is journaled on the upstanding brackets 33 adjacent the end of the housing 1, which is remote from the cylinders 5.

As clearly seen in Figure 1 of the drawings, the bifurcations 30 of the connecting rods 31 straddle the cylinder 5.

An upstanding bracket 34 is mounted in the housing 1, between the cylinders 5, and has formed integrally thereon the upstanding pairs of opposed apertured ears 35. The brackets 34 further include the supporting legs 36. A transversely extending cam shaft 37 has intermediate portions journaled in certain of the apertured ears 35, said cam shaft extending transversely over the cylinders 5 and having its opposite end portions supported in the bearings 38 on the cylinders. A bevelled gear 39 is fixed on the cam shaft 37, at a point intermediate the ears 35, through which cam shaft extends. A drive shaft 40 has one end portion journaled through another of the apertured ears 35 on the bracket 34, and has fixed on said end portion a bevelled gear 41, which meshes with the gear 39, for driving the cam shaft 37. A gear 42 is fixed on the other end of the drive shaft 40 and meshes with the bevelled gear 43, on an intermediate portion of the crank shaft 32, for actuation by said crank shaft. This end of the drive shaft 40 is supported in the upstanding bearing 44, in the pan 2.

Pairs of eccentrics, one of which is shown in detail in Figure 12 of the drawings, are fixed on the opposite end portions of the cam shaft 37, a pair of said eccentrics being fixed on the shaft 37 on both sides of each of the bearings 38. The eccentrics are designated by the reference numeral 45 and have their peripheries grooved to receive the rings 46, to which one end of the valve rods 47 are connected. The opposite ends of the valve rods 47 are connected to the free ends of the arms 21 and 22, of the intake and exhaust valves 19 and 20. The eccentrics 45, are, of course, so positioned on the cam shaft 37 that the intake and exhaust valves on the opposite ends of each of the cylinders 5 will be opened and closed at the proper time, as will be readily apparent.

A driven shaft 48 has one end portion journalled in the remaining apertured ear 35 of the supporting brackets 34 and has fixed thereon a bevelled gear 49 which is in mesh with the gear 39. The driven shaft 48 is journaled through the end wall of the housing 1, through which the cylinders 5 project.

An integral cylinder 50 depends from the body portion of the bracket 34 and terminates closely adjacent the bottom of the cam 2, and has formed at its lower end portion and in its sides the intake ports 51 (see Figure 8) and the outlet port 52, said ports being controlled by the ball check valves 53 and 54, respectively. The cylinder 50 is open at its upper end and mounted for reciprocation therein on the rod 55 is the piston 56.

The piston rod 55 is operatively connected to the cam shaft 37, for actuation thereby through the medium of the eccentric ring connection designated generally by the reference numeral 56 and including the stem 57 which is pivotally connected to the upper end portion of the rod 55.

An oil reservoir 58 is mounted in elevated position on one side of the bracket 34, through the medium of the strap 59, and an oil supply pipe 60 extends from the outlet port 52 of the cylinder 50 to the upper portion of the oil reservoir 58. The elongated pans 61 are mounted longitudinally on opposite sides of the cylinders 5 above the slots 29 and said distributing pans are provided with perforated bottoms whereby oil which is discharged therein will be deposited on the joint between the bifurcations 30 and the piston pins 28, throughout the travel of the joints. Oil conducting pipes 62 and 63 extend from opposite sides of the reservoir 58 into the upper side of each of the cylinders 5, for lubricating the pistons in each cylinder. Branches 64 and 65 extend from each of the pipes 63 to the distributing pans 61 for discharging lubricating oil into said pans.

If desired, a pump 66 may be disposed in the housing 1 and driven from the shaft 40 through the medium of the sprocket chain 67 trained over sprocket gears fixed on the pump shaft and arm of said shaft 40.

The pump 66 may be provided with branches 68 for the passage of air, and said pumps may be connected with suitable reservoirs in which the air may be stored under pressure for delivery to the cylinders 5 as needed.

The operation of the engine is believed to be apparent. Reciprocation of the pistons in the cylinders 5 actuates the crank shaft 32, through the medium of the conducting rods 1, and the drive shaft 40 is rotated and in turn actuates the shaft 37. The shaft 37 operates the intake and exhaust valves on the opposite ends of the cylinders 5 and also operates the pistons 56 in the depending cylinder 50 for elevating lubricating oil from the pan 2 to the reservoir 58. As before explained, the oil travels over the cylinder to the reservoir 58, through the pipe 60. From the reservoir 58, the lubricating oil flows by gravity through the pipes 62 and 63, and the branches 64 and 65, to opposite side portions of the cylinders 5 and also to each of the distributing pans 61, from which the oil is, as also before explained, deposited on the connections between the furcations 30 and the piston pins 28. It will thus be seen that a constant supply of the lubricating oil will be supplied to the various moving parts of the engine. Any desired number of pipes may be connected with the reservoir 58 and extend to any desired part of the engine for lubricating the different elements, such as the gears 39, 41, and 49, and also the eccentrics 45, which carry the rings 46, the bearings for the crank shaft 32 and also the connecting rod bearings on the crank shaft. Power is delivered from the engine to any suitable point through the medium of the driven shaft 48. Any desired number of the cylinders 5 may be divided in the engine. The engine is designed to operate on a fuel charge consisting approximately of one-third gasoline and two-thirds air.

It is believed that the many advantages of an internal combustion engine constructed in accordance with this invention will be readily understood and although the preferred embodiment of the invention is as illustrated and described, it is to be understood that changes in the details of construction may be had, which will fall within the scope of the invention as claimed.

What is claimed is:

1. In an internal combustion engine, the combination comprising an oil pan, a pair of spaced, parallel cylinders disposed horizontally in the pan, pistons mounted for reciprocation in the cylinders, a crank shaft mounted in the pan transversely with respect to the cylinders, and in spaced relation to one end thereof, a cam shaft extending transversely above intermediate portions of the cylinders, means connecting the valves of the cylinders to the end portions of the cam shaft for actuation thereby, a shaft extending in substantial parallelism with the cylinders and having its ends operatively connected to intermediate portions of the crank shaft and the cam shaft for actuating said cam shaft, a driven shaft operatively connected with said intermediate portion of the cam shaft for actuation thereby.

2. In an internal combustion engine, the combination comprisng an oil pan, a pair of spaced, parallel cylinders disposed horizontally in the pan, pistons mounted for reciprocation in the cylinders, a crank shaft mounted in the pan transversely with respect to the cylinders and in spaced relation to one end thereof, a cam shaft extending transversely above intermediate portions of the cylinders, means connecting the valves of the cylinders to the end portions of the cam shaft for actuation thereby, a shaft extending in substantial parallelism with the cylinders and having its ends operatively connected to intermediate portions of the crank shaft and the cam shaft for actuating said cam shaft, a driven shaft operatively connected with said intermediate portion of the cam shaft for actuation thereby, an oil reservoir disposed above the horizontal plane of the cylinders, a pump disposed in the pan and having a pipe connection with the reservoir for discharging oil thereinto from the pan, means operatively connecting the pump to the cam shaft for actuation thereby, and pipes connecting the reservoir with the cylinder for conducting oil by gravity to said cylinders.

In testimony whereof I affix my signature.

TANIS GABILL.